July 31, 1962   M. V. TAMBOLLEO   3,047,237
PLASTERING MACHINE
Filed Nov. 3, 1961
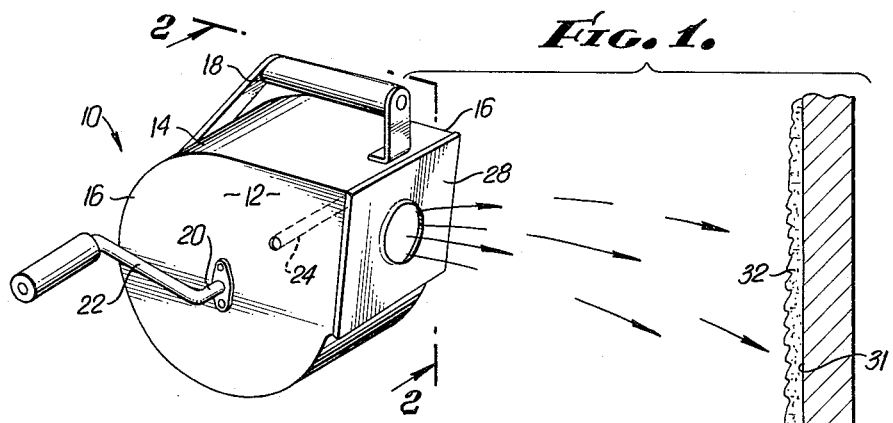
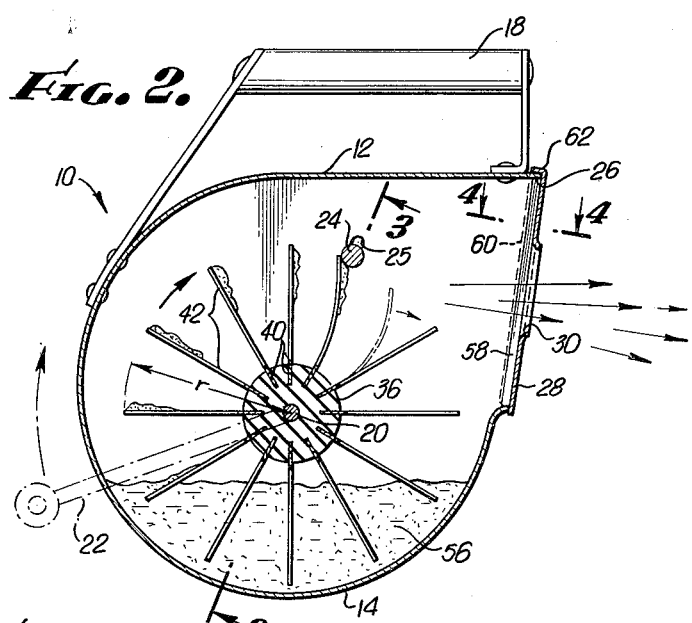
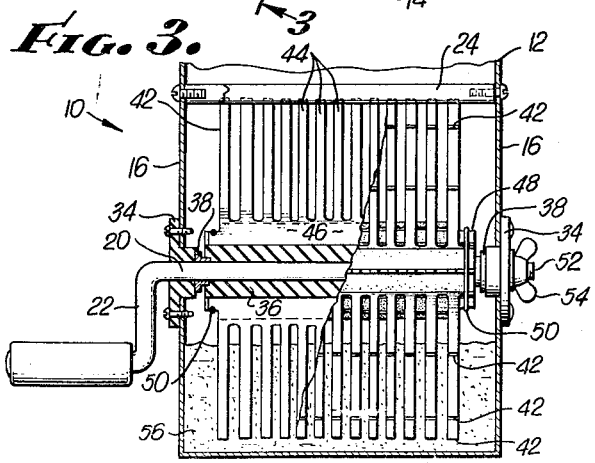
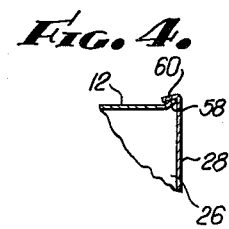
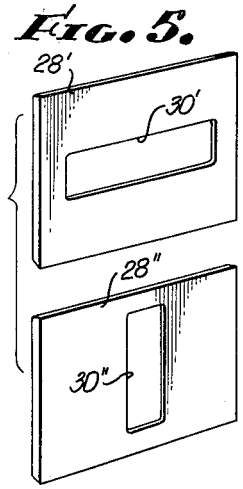
INVENTOR.
MARIO V. TAMBOLLEO
BY
Nilsson & Robbins
ATTORNEYS.

United States Patent Office

3,047,237
Patented July 31, 1962

3,047,237
PLASTERING MACHINE
Mario V. Tambolleo, 10812 Capistrano Ave.,
Lynwood, Calif.
Filed Nov. 3, 1961, Ser. No. 149,935
2 Claims. (Cl. 239—215)

This invention relates generally to machines for applying plaster to surfaces, and more specifically to a machine for spraying textured plaster upon the walls of a building or other structure.

In the fields of building and building maintenance, it is often desired to plaster relatively small areas with a textured-surface plaster, such as, for example, when the plastering of larger areas is being patched or otherwise repaired. A large proportion of homes, apartments, motels and other buildings, including business structures have textured surfaces both inside and out. For example, acoustical plaster which is highly textured, is very frequently used in present day construction; and in some sections of the United States stucco is used to cover exterior surfaces in a majority of structures. In addition, texture plastered surfaces are often desired for decorative effects or advertising.

Textured surfaces such as the examples given are frequently subjected to damage from indirect impact or abrasion, as well as from atmospheric or climatic causes. When it is desired to repair such damage, or to remodel or initially to apply the textured plaster, it has heretofore been required that a skilled artisan be employed with complex and bulky heavy machinery, including a compressor and motive power, to make the repairs irrespective of how small is the area to be patched. Such machines and skilled labor are relatively extremely expensive particularly when the area to be plastered is relatively small. Furthermore, the machinery is difficult to clean after each use and tends to spray plaster over large areas, thus requiring extra effort and expense in protecting furniture, draperies and carpeting from the spray and plaster dust.

Other disadvantages of these machines include the lack of fine control regarding the area to be covered, thickness of the applied layer, and the texture character. Such limitations manifest themselves in not permitting desired control of the edges of the patch or areas near windows or fixtures. They also preclude satisfactory control for "feathering" or matching the borders of a patched area to the original surrounding area.

An alternative to heavy machine plastering techniques, is to apply the plaster by hand methods. However, satisfactory results generally require time consuming labor of a skilled and experienced artisan to match textures and to "feather" the transition region between the small area and the surrounding areas.

It is therefore an object of the present invention to provide a plastering machine which is not subject to these and other disadvantages of the prior art.

It is another object to provide such a plastering machine which is lightweight and completely portable.

It is another object to provide such a plastering machine which is adaptable to spray or splatter apply plaster at any angle.

It is another object to provide such a structure which may be utilized for interior plaster or exterior stucco.

It is another object to provide such a plastering machine which can apply plaster with a wide range of textures.

It is another object to provide such a plastering machine which is particularly useful for patching textured plaster.

It is another object to provide such a plastering machine with which an inexperienced person may readily and precisely control the area and thickness of application of plaster.

It is another object to provide such a plastering machine which is readily cleanable after each use.

It is another object to provide such a plastering machine which may be hand held and which operates from hand power.

Briefly, these and other objects are achieved in accordance with one example of the present invention by providing a hand holdable housing for a relatively small reservoir of plaster mixture. Supported within the housing is a cylindrical hub about which are mounted a plurality of comb members having radially extending teeth disposed in rows parallel to the axis of the hub. A cranking handle is affixed to a portion of the hub which extends through the wall of the housing for rotating the hub about its axis. The comb teeth pick up and carry plaster mixture from the reservoir as they are pulled through it by the hub rotation. A splattering rod is provided which is supported by the housing and extends across its interior parallel to the hub, but for this splattering rod the comb assembly may rotate freely through the mixture and the other space within the housing. The rod is disposed from the hub by a distance slightly less than a length of the extension therefrom of the comb teeth. The teeth are resilient and are sprung and released by their contact with the rod so as to throw off substantially tangentially whatever plaster mixture is being carried by the teeth.

An opening is provided in the housing in line with the trajectory of the thrown off plaster mixture. Thus by rotating the cranking handle and directing the opening toward a particular area, that area may be texture plastered. The viscosity of the plaster mixture, the geometry of the teeth and rod, the speed of cranking and the distance from the area being plastered readily provide a desirable control over the applying of the plaster including its texture and thickness.

Further details of these and other novel features and their operation, as well as additional objects and advantages, will become apparent and be best understood from a consideration of the following description taken in connection with the accompanying drawing which is presented by way of example only and in which:

FIG. 1 is an over-all perspective view of an example of a portable plastering machine constructed in accordance with the principles of the present invention;

FIG. 2 is a cross-sectional view of the structure of FIG. 1 taken along the section lines 2—2 thereof;

FIG. 3 is a longitudinal sectional view of the structure of FIG. 1 taken along the section lines 3—3 of FIG. 2;

FIG. 4 is a sectional view of a portion of the structure of FIG. 1 taken along the section lines 4—4 of FIG. 2; and FIG. 5 is a perspective view of alternative versions of a portion of the structure of FIG. 1.

Referring to the particular figures, it is stressed that the details shown are by way of example only and are presented in the cause of providing what is believed to be the most useful and readily understood description of the principles of the invention. The detailed showing is not to be taken as a limitation upon the scope of the invention which is to be measured only by the appended claims which form a part of this specification.

In FIG. 1 an example of a plastering machine 10 is illustrated which includes a housing 12 which includes a portion 14 which is substantially cylindrical with a circular, eccentric circular, or elliptical-like cross-section. The housing 12 further includes a pair of substantially planar members 16 which are disposed perpendicularly to the axis or the length of the cylindrical portion 14. A handle 18 is attached to the housing 12 in a conventional manner, as by welding or riveting.

A shaft or axle 30 extends between the planar portions 16 parallel to the length of the cylindrical portion 14. A cranking handle 22 is affixed to the axle 20 for purposes of rotating it by hand about its axis. A splattering rod 24 also extends between the planar portions 16 within the housing 12 parallel to the axle 20. The housing 12 is relieved to form a general opening 26, this opening provides access to the interior of the housing 12 for purposes of cleaning it and otherwise maintaining the machine and filling it with a plastering mixture. Partially occluding the general opening 26 is a spray reducing cover 28 which is relieved to form an opening 30 through which, as will be described more fully below in connection with the description of the other figures, the plaster mixture is sprayed and directed toward a wall surface 31 to form thereon a layer of textured plaster 32. The spray reducing cover 28 is readily removable from the housing 12 in a manner which is described below.

Referring to FIG. 2 and FIG. 3, that portion of the plastering machine 10 which is within the housing 12 is shown in more detail. Mounted on the planar portions 16 are a pair of bushings 34 through which pass the axle 20 of the cranking handle 22. Closely surrounding the axle 20 is a retaining hub 36 which is preferably of a resilient, friction exerting material such as rubber, and which extends for substantially the length of the axle between the bushings 34. A pair of thrust bearings 38 are provided to separate the hub 36 from the bushings 34.

Extending from the hub 36 and retained by slots 40 therein are disposed a plurality of planar comb members 42. Each of the comb members includes a plurality of teeth 44 which extend outwardly from the hub to a radial distance $r$ from the axis of the axle 20. Each of the comb members 42 may be stamped or otherwise formed from a sheet of resilient material such as spring steel and each includes a backing portion 46 which extends longitudinally beyond each of the end ones of the teeth 44 to form a retaining edge 48 at each end of the comb member 42. The comb members 42 may thereby be inserted into a respective longitudinal slot 40 and retained therein as by the friction with the hub or its rubber-like material as well as by a retaining ring 50 which encompasses the retaining edge 48 of all of the comb members 42 and urges and secures them radially inwardly. The hub 36 is snugly fit about the axle 20 and the inward compression of the retaining rings 50 may provide additional friction between the hub and the axle thus to angularly secure them together. The right hand end 52, as viewed in the drawing, of the axle 20 may be threaded and a nut 54 inserted thereon to secure the assembly of the cranking handle 22, axle 20, and the housing 12.

The splattering rod 24, as indicated above, is disposed parallel to the axle 20 and extends between the planar portions 16 of the housing 12. The rod 24 is disposed at a distance laterally from the center of the axle 20 which distance is somewhat less than $r$; that is, the radial extremity of the teeth 42. Thus, it may be seen that as the hub and comb assembly is rotated by the operation of the cranking handle 22, the teeth 44 of the comb members 42 rotate substantially freely through a reservoir 56 of plaster mixture in the bottom portion of the circularly cylindrical portion 14 of the housing 12. The teeth are each momentarily interrupted by the splattering bar 24 and then abruptly released which causes any plaster mixture being carried by the teeth to be forcefully projected substantially tangentially toward the general opening 26 and the reduced opening 30 in the cover 28 which is disposed slidably removably over the general opening 26.

Referring to FIG. 4 it is illustrated that the vertical edges 58 of the general opening 26 are flared outwardly to form a retaining edge along which a matching vertical retaining edge 60 of the cover 28 thus permitting the cover 28 to be slidably removed and replaced. The upper edge 62 of the cover 28 may be bent over as illustrated to form a stop for the downward sliding of the cover 28 over the general opening 26. The lipped edges of the cover 28 also add to its strength and rigidity.

Referring to FIG. 5, alternative versions of the cover 28 are illustrated. The covers 28' and 28" are similar to the cover 28 of the previous figures in all important respects except that their respective openings 30' and 30" are particularly shaped to facilitate in providing the particular desired pattern of application of the textured plaster.

In a particular practical embodiment of the invention, it was found to be particularly useful to form the curved surfaces of the housing 12 from a strip of sheet metal approximately six inches by twenty-five inches with one-quarter inch hems around its periphery. The cylindrical portion 14 in this example had a diameter of approximately eight inches. The hub 36 was formed of rubber and was five and three-quarter inches long and approximately two inches in diameter. Sixteen symmetrically disposed longitudinal cuts seven-sixteenths of an inch deep were provided along its length for retaining the teeth of the comb members 42. The diameter of the axle 20, as well as the axial bore in the hub 36, was one-quarter of an inch. The splattering bar 24 was six and one-half inches long by one-half inch in diameter. The spring steel comb members 42 were formed from sheet spring steel one-tenth of an inch in thickness and had fourteen teeth approximately evenly spaced along the length of the comb. The length of the teeth was approximately two and one-half inches. The opening 30 in the cover 28 was circular and was approximately one and three-quarter inches in diameter. The radial spacing of the splattering bar 24 from the axle 20 was adjustable over approximately one-quarter inch range by virtue of the slots 25 through which the screws supporting the splattering rod 24 pass.

In operation, the operator may remove the core 28 from the housing 12 and partially fill the reservoir portion 56 thereof with plaster mixture as indicated. The cover 28 is then replaced and the machine 10 is directed toward the area to be texture plastered. When the cranking handle 22 is rotated in a clockwise direction as viewed in FIG. 1, the teeth 44 pass through the reservoir 56 of plaster mixture and pick up and carry therefrom small amounts of the mixture. When the teeth are interrupted and then abruptly released by the splattering bar 24, the plaster is projected toward the general opening 26. A portion of the plaster is directed in a controlled path through the opening 30 in the cover 28 and by adjusting the angular velocity of the cranking motion and the direction of the spraying plaster mixture, the operator may with precise control readily patch or otherwise plaster small areas of texture plaster with convenience and economy.

What is claimed is:

1. A plastering machine comprising: a hand holdable housing having a substantially cylindrical portion and being predominantly closed and including substantially planar wall portions disposed perpendicularly to the length of said cylindrical portion, an axle extending parallel to said length between and supported by said wall portions, a cranking handle affixed to said axle and extending through one of said wall portions, bushing means disposed on each of said wall portions for rotatably supporting said axle and cranking handle, an elongated rubber hub disposed substantially concentrically about said axle and rotationally secured thereto, thrust bushings disposed about said axle between each end of said hub and a respective one of said bushings, a plurality of more than ten and less than twenty planar comb members composed of spring sheet metal and including a longitudinal back member and a plurality of resilient teeth extending transversely therefrom, said longitudinal back member extending beyond the end ones of said teeth thereby to form a longitudinal retaining edge at each end of said back member, said rubber hub and said extending longitudinal back member being approximately of equal length, said rubber hub being relieved to form a plurality of radial-axial retaining slots for said longitudinal back members of said planar comb members, retaining ring means for compressibly retaining said retaining edges of all of said comb members when inserted into said slots, said resilient teeth extending radially outwardly to a predetermined radius, a splattering rod extending substantially parallel to said axle at a radial distance therefrom such that said rod lies at least partially within said radius, said housing being relieved to form a general opening therein to provide access into said housing and communication between said rod and a surface to be plastered along a solid angle substantially symmetrically disposed about a direction generally perpendicular to the radius between said rod and said axle, a removable spray reducing cover for said general opening which is relieved to form a smaller opening for reducing the angle of said communication, and a holding handle means rigidly affixed to said housing for hand holding said housing and directing said solid angle toward said surface to be plastered.

2. A plastering machine comprising: a hand holdable housing having a substantially cylindrical portion and being predominantly closed and including substantially planar end wall portions disposed perpendicularly to the length of said cylindrical portion, an axle extending parallel to said length between and supported by said wall portions, a cranking handle affixed to said axle and extending through one of said wall portions, bushing means disposed on each of said wall portions for rotatably supporting said axle and cranking handle, an elongated hub of elastically compressible material disposed substantially concentrically about said axle and rotationally secured thereto, thrust bushings disposed about said axle between each end of said hub and a respective one of said bushings, a plurality of more than ten and less than twenty planar comb members composed of sheet metal and including a longitudinal back member and a plurality of teeth extending transversely therefrom, said longitudinal back member extending beyond the end ones of said teeth thereby to form a longitudinal retaining edge at each end of said back member, said hub and said extending longitudinal back member being approximately of equal length, said hub being relieved to form a plurality of radial-axial retaining slots for angularly resiliently supporting said longitudinal back members of said planar comb members, retaining ring means for radially compressibly retaining said retaining edges of all of said comb members when inserted into said slots, said teeth extending radially outwardly to a predetermined radius, a splattering member extending substantially parallel to said axle at a radial distance therefrom such that said splattering member lies at least partially within said radius, said housing being relieved to form a general opening therein to provide access into said housing and communication between said splattering member and a surface to be plastered along a solid angle substantially symmetrically disposed about a direction generally perpendicular to the radius between said splattering member and said axle, a removable spray reducing cover for said general opening which is relieved to form a smaller opening for reducing the angle of said communication, and a holding handle means rigidly affixed to said housing for hand holding said housing and directing said solid angle toward said surface to be plastered.

References Cited in the file of this patent
UNITED STATES PATENTS 2,965,306     Daignas _____ Dec. 20, 1960

FOREIGN PATENTS 363,960     Italy _____ Oct. 18, 1928